United States Patent
Wietfeldt

(10) Patent No.: US 9,622,069 B2
(45) Date of Patent: Apr. 11, 2017

(54) SYSTEMS AND METHODS FOR MULTIPLE NETWORK ACCESS BY MOBILE COMPUTING DEVICES

(71) Applicant: QUALCOMM Incorporated, San Diego, CA (US)

(72) Inventor: Richard Dominic Wietfeldt, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 107 days.

(21) Appl. No.: 14/283,977

(22) Filed: May 21, 2014

(65) Prior Publication Data
US 2015/0341778 A1    Nov. 26, 2015

(51) Int. Cl.
H04M 3/00    (2006.01)
H04W 8/18    (2009.01)
(Continued)

(52) U.S. Cl.
CPC ........ H04W 8/183 (2013.01); G06F 13/4004 (2013.01); H04J 3/04 (2013.01);
(Continued)

(58) Field of Classification Search
CPC ..... H04W 8/183; H04W 92/10; H04W 88/06; H04J 3/04; G06F 13/4004; Y02B 60/1228; Y02B 60/1235; Y10T 29/49119
(Continued)

(56) References Cited

U.S. PATENT DOCUMENTS 7,184,466 B1    2/2007    Seemann et al.
7,751,850 B2    7/2010    Karaoguz
(Continued)

FOREIGN PATENT DOCUMENTS

DE    102012014549 A1    1/2014
EP    1496714 A1    1/2005
WO    2013017733 A1    2/2013

OTHER PUBLICATIONS

International Search Report and Written Opinion for PCT/US2015/030711, mailed Jul. 16, 2015, 11 pages.
(Continued)

Primary Examiner — Babar Sarwar
(74) Attorney, Agent, or Firm — Withrow & Terranova, PLLC

(57) ABSTRACT

Systems and methods for multiple network access by mobile computing devices are disclosed. In one embodiment, a data bus is used to couple multiple baseband processor endpoints to multiple network access cards, such that each baseband processor endpoint may communicate over the data bus to any of the network access cards. In an exemplary, non-limiting embodiment, the baseband processor endpoint is a modem and the network access cards are subscriber interface module (SIM) cards or universal integrated circuit cards (UICCs). By allowing each of the baseband processor endpoints to use any of the network access cards, different networks may be used for different purposes by the mobile computing device. Further, the use of a single bus in this manner may allow for greater scalability, while also saving pin count, silicon area, board area, and power consumption within the computing device. Such savings ultimately improve the cost of the device.

23 Claims, 6 Drawing Sheets

(51) Int. Cl.
   *H04J 3/04* (2006.01)
   *G06F 13/40* (2006.01)
   *H04W 88/06* (2009.01)
   *H04W 92/10* (2009.01)

(52) U.S. Cl.
   CPC ............ *H04W 88/06* (2013.01); *H04W 92/10* (2013.01); *Y02B 60/1228* (2013.01); *Y02B 60/1235* (2013.01); *Y10T 29/49119* (2015.01)

(58) Field of Classification Search
   USPC ......... 455/500, 424, 551, 552.1, 558, 562.1, 455/101, 132, 412.1, 422; 375/222, 219, 375/220, 267, 295, 299; 370/328–332, 370/334
   See application file for complete search history.

(56) References Cited

U.S. PATENT DOCUMENTS

| | | | |
|---|---|---|---|
| 8,265,563 | B2 | 9/2012 | Beninghaus et al. |
| 2012/0270602 | A1 | 10/2012 | Card |
| 2013/0156081 | A1* | 6/2013 | Tat ........................ H04W 88/06 375/222 |
| 2015/0173046 | A1* | 6/2015 | Ehrentraut ............ H04W 12/06 370/329 |

OTHER PUBLICATIONS

Third Written Opinion for PCT/US2015/030711, mailed Aug. 17, 2016, 6 pages.
International Preliminary Report on Patentability for PCT/US2015/030711, mailed Sep. 9, 2016, 17 pages.
Second Written Opinion for PCT/US2015/030711, mailed May 13, 2016, 6 pages.

* cited by examiner

SYSTEMS AND METHODS FOR MULTIPLE NETWORK ACCESS BY MOBILE COMPUTING DEVICES

BACKGROUND

I. Field of the Disclosure

The technology of the disclosure relates generally to mobile computing devices and subscriber access cards that enable the mobile computing devices to interoperate with subscriber networks.

II. Background

Mobile computing devices have become increasingly common in everyday life. The ability to use such devices as mobile phones, tablets, laptops, and other small, portable, wireless communication devices to remain in contact with friends, family, colleagues, co-workers, and the like is perceived to have great value to the users of such devices. In most situations, such users contact a service provider such as AT&T®, VERIZON®, SPRINT®, or the like, and agree to a service contract that provides the user access to a subsidized mobile terminal and access to a wireless network maintained by the service provider through the mobile terminal. Other service providers offer pay-as-you-go type contracts or the like.

To control access to the wireless network maintained by the service provider, the service provider may require that the mobile terminal have credentials with which to authenticate the mobile terminal to the wireless network. Such credentials may be stored in a secure format on a subscriber interface module (SIM) card or a universal integrated circuit card (UICC) that is received within the housing of the mobile terminal and accessed by a control system of the mobile terminal as needed to pass the credentials to the wireless network. The UICC is generally a single card on which all SIM applications can be placed, including SIM (the original Global System for Mobile communications (GSM) Subscriber Identity Module), USIM (user SIM), CSIM (CDMA SIM), and RUIM (Removable User Identity Module). Each of these types of SIM is viewed as an application, whereby one or many of them can coexist on a physical UICC. Other systems, such as systems that rely on code division multiple access (CDMA) protocols may use a virtual network access card to store such credentials.

While many users may be content to have a single service provider, there may be instances in which users may require access to multiple service providers. In such an event, the user may need to have multiple SIM cards or UICCs so that the mobile terminal may be authenticated with each service provider. Accordingly, there is a need to provide a mobile terminal that may efficiently interact with a plurality of SIM cards and/or UICCs.

SUMMARY OF THE DISCLOSURE

Embodiments disclosed in the detailed description include systems and methods for multiple network access by mobile computing devices. In exemplary embodiments, a data bus is used to couple multiple baseband processor endpoints to multiple network access cards, such that each baseband processor endpoint may communicate over the data bus to any of the network access cards. In an exemplary, non-limiting embodiment, the baseband processor endpoint may be a modem and the network access cards may be subscriber interface module (SIM) cards or universal integrated circuit cards (UICCs). By allowing each of the baseband processor endpoints to use any of the network access cards, different networks may be used for different purposes by the mobile computing device. Further, the use of a single bus in this manner may allow for greater scalability, while also saving pin count, silicon area, board area, and power consumption within the mobile computing device. Such savings ultimately improve the cost of the device.

In this regard in one embodiment, a computing system is disclosed. The computing system comprises a plurality of baseband processor endpoints. The computing system also comprises a communication interface configured to couple to a data bus and allow serialized communication from each of the plurality of baseband processor endpoints to any one of a plurality of network access cards.

In another embodiment, a computing system is disclosed. The computing system comprises a plurality of network access card interfaces, each configured to receive a physical, removable network access card. The computing system also comprises a plurality of baseband processor endpoints. The computing system further comprises a data bus comprising a data channel and a clock channel. The data bus is coupled to each of the plurality of network access card interfaces and the plurality of baseband processor endpoints, such that any baseband processor endpoint may communicate with a network access card positioned in any of the plurality of network access card interfaces.

In another embodiment, a method of assembling a mobile terminal is disclosed. The method comprises providing a serial data bus. The method also comprises coupling a plurality of network access cards to the serial data bus. The method also comprises coupling a plurality of baseband processor endpoints to the serial data bus such that any of the plurality of baseband processor endpoints may communicate with any of the plurality of network access cards.

In another embodiment, a method of operating a computing system is disclosed. The method comprises allowing each of a plurality of baseband processor endpoints to communicate to each of a plurality of network access cards over a serial data bus.

DETAILED DESCRIPTION

Figure 1:
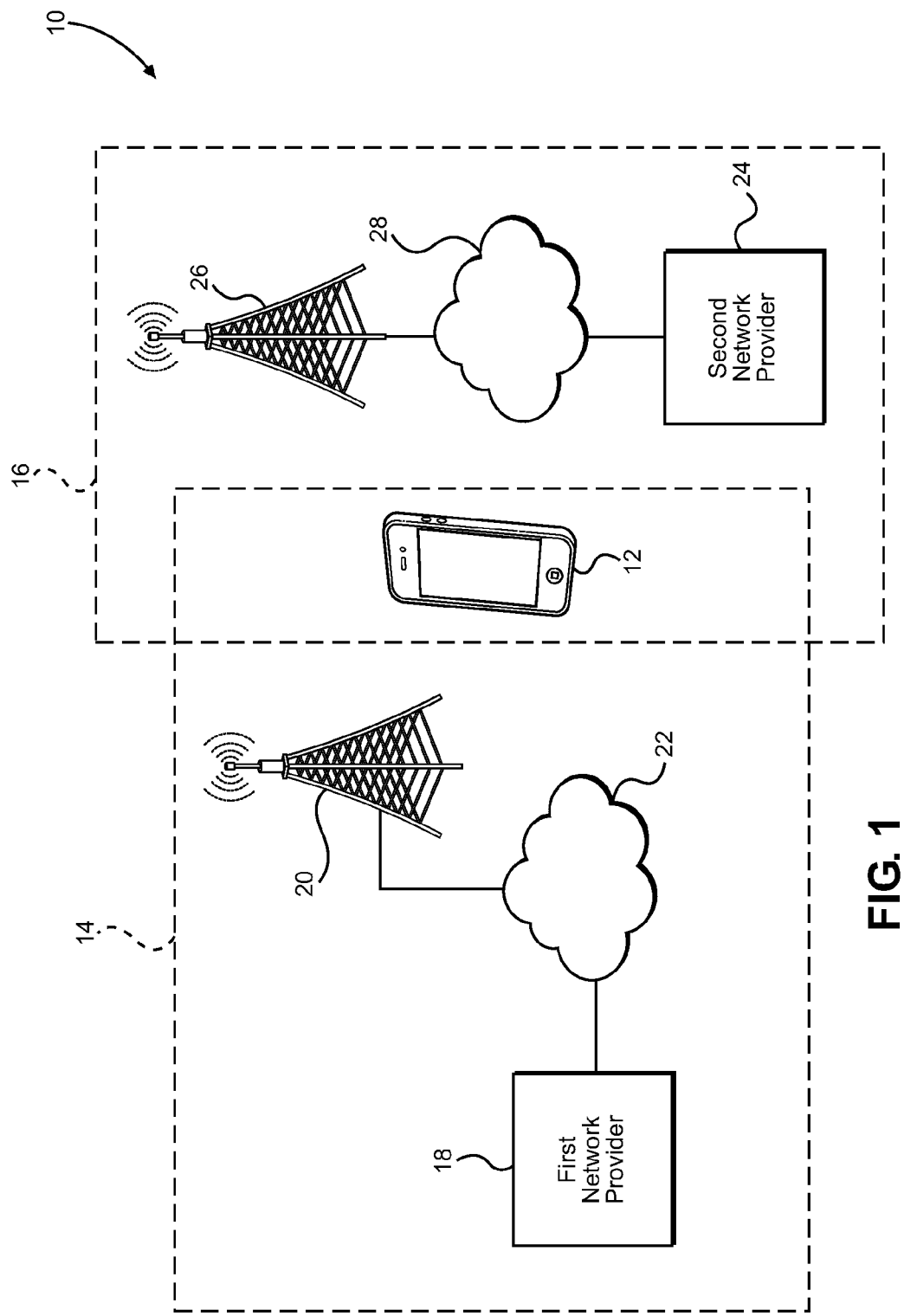
FIG. 1 is a simplified illustration of an exemplary mobile terminal in a plurality of communication networks.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include systems and methods for multiple network access by mobile computing devices. In exemplary embodiments, a data bus is used to couple multiple baseband processor endpoints to multiple network access cards, such that each baseband processor endpoint may communicate over the data bus to any of the network access cards. In an exemplary, non-limiting embodiment, the baseband processor endpoint may be a modem and the network access cards may be subscriber interface module (SIM) cards or universal integrated circuit cards (UICCs). By allowing each of the baseband processor endpoints to use any of the network access cards, different networks may be used for different purposes by the mobile computing device. Further, the use of a single bus in this manner may allow for greater scalability, while also saving pin count, silicon area, board area, and power consumption within the mobile computing device. Such savings ultimately improve the cost of the device.

Before addressing exemplary embodiments of the present disclosure, additional material is provided about the nature of SIM cards. While normally each SIM card operates with one defined wireless provider in some instances, it may be possible to use a SIM card that supports two or more wireless providers, by virtue of roaming or other agreements between providers. Such shared use may be configured into the SIM card. This agreement may sometimes be referred to as "multi-SIM" or "multi SIM technology," which allows the aggregation of multiple SIM credentials onto one physical card.

As additional background, each SIM is normally provisioned with a unique International Mobile Subscriber Identity, or IMSI, which uniquely identifies the identity amongst all operators throughout the globe. Some SIMs may also be provisioned with multiple profiles or policies, each distinguished with a unique IMSI. One application of this is a Dual IMSI which supports two subscriptions (e.g. two different phone numbers) for business and personal needs.

In this regard, FIG. 1 is a simplified diagram of a communication environment 10 with a mobile terminal 12 operating within networks 14, 16. Networks 14, 16 may be wireless (for example, cellular). The network 14 is formed by a first network provider 18 that operates one or more base stations 20 through a communication network 22. In an exemplary embodiment, the communication network 22 may be part of or include parts of the Public Land Mobile Network (PLMN), the Public Switched Telephone Network (PSTN), and/or the Internet. The network 16 is formed by a second network provider 24 that operates one or more base stations 26 through a communication network 28. In an exemplary embodiment, the communication network 28 may be part of, or include parts of the PLMN, the PSTN, and/or the Internet. In a further exemplary embodiment, network providers 18, 24 may be competitors, such as AT&T®, VERIZON®, SPRINT®, or the like. The mobile terminal 12, operating according to exemplary embodiments of the present disclosure, may operate within both networks 14 and 16. Because the network providers 18, 24 are competitors, they normally have proprietary measures that preclude unauthorized use of the respective networks 14, 16. In an exemplary embodiment, the proprietary measure takes the form of a SIM card or UICC that is installed in the mobile terminal 12. When the mobile terminal 12 attempts to access a given network 14, 16, the mobile terminal 12 may be asked to provide credentials from the SIM card or UICC before access is provided. While there are exceptions such as emergency calls (e.g., 911 calls), in general, the mobile terminal 12 must have an appropriate network access card to access a network, such as the networks 14, 16 of FIG. 1.

Exemplary embodiments of the present disclosure provide systems and methods that simplify the co-existence of multiple network access cards within the mobile terminal 12 of FIG. 1, such that the mobile terminal 12 readily operates with multiple proprietary networks such as the networks 14, 16. By providing access to multiple proprietary networks, a user may have greater flexibility in use of the mobile terminal 12. For example, for regions in which a first network (e.g., network 14) has poor coverage, the mobile terminal 12 may operate in the second network (e.g., network 16), and vice versa. Likewise, if the user has reached a cap on a data plan with a first network provider 18, the mobile terminal 12 may be used to access data from the second network provider 24. Still other uses for multiple network access are possible.

It is worth noting that conventional mobile terminals operating without the benefit of the present disclosure might have access to multiple networks by using Dual SIM Dual Standby (DSDS) or Dual SIM Dual Access (DSDA) implementations. DSDS and DSDA provide a network access card coupled to a baseband processor for each network (i.e., one network access card is attached to one baseband processor, and the other network access card is attached to the other baseband processor). Embodiments of the present disclosure allow consolidation of the data links between network access cards and the baseband processors. Additionally, embodiments of the present disclosure allows greater flexibility and scalability by allowing multiple baseband processors to communicate with multiple network access cards instead of the one to one arrangement of DSDS and DSDA.

Figure 2:
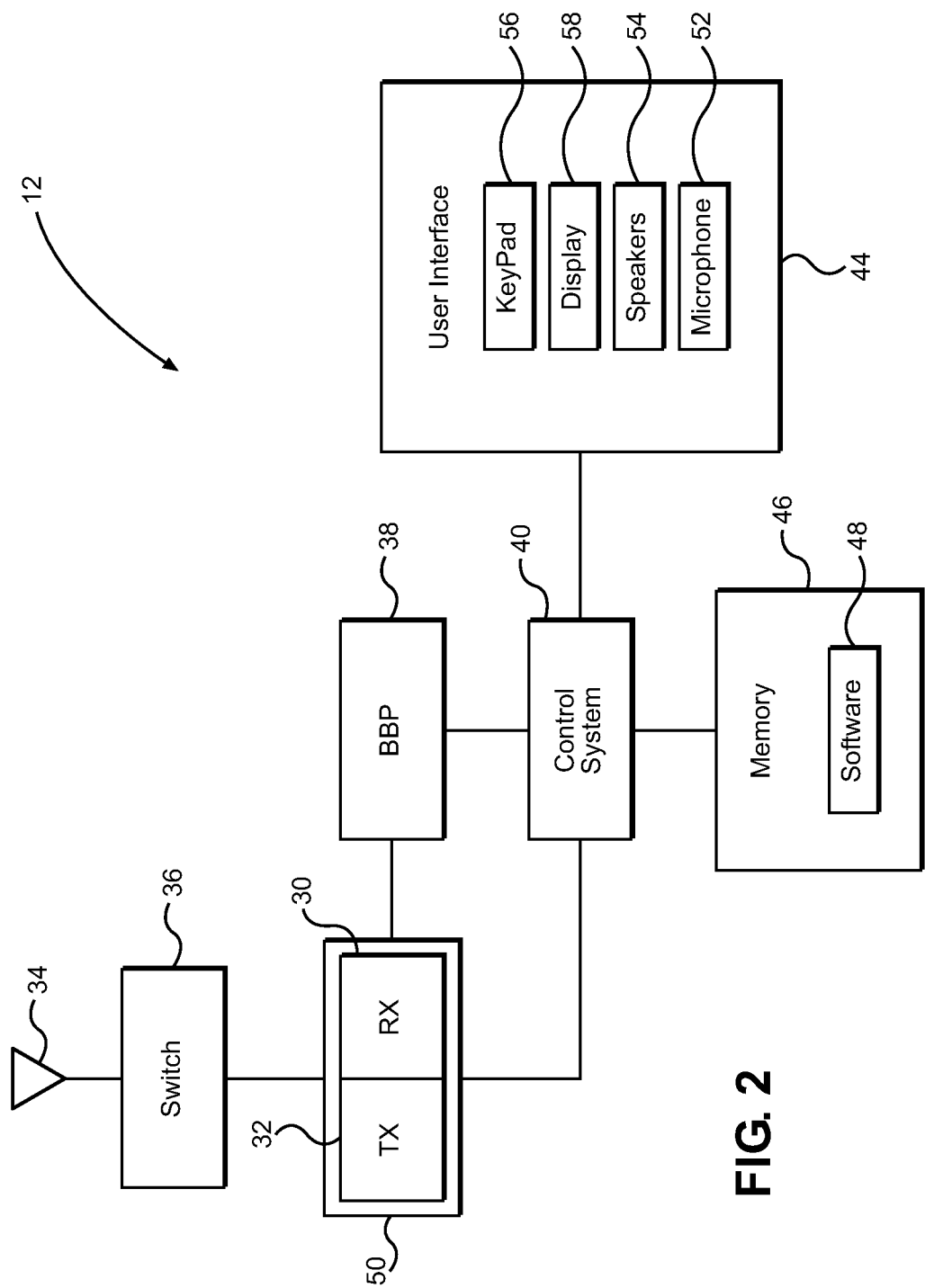
FIG. 2 is a simplified block diagram of a transceiver and control system within a mobile terminal, such as the mobile terminal of FIG. 1.

FIG. 2 provides more detail regarding some of the components within the mobile terminal 12 of FIG. 1. In this regard, the mobile terminal 12 may include a receiver path 30, a transmitter path 32, an antenna 34, a switch 36, a baseband processor (BBP) 38, a control system 40, a frequency synthesizer (not illustrated), a user interface 44, and memory 46 with software 48 stored therein.

The receiver path 30 receives information bearing radio frequency (RF) signals from one or more remote transmitters provided by a base station, such as the base station 20 in FIG. 1. A low noise amplifier (not shown) amplifies the signals. A filter (not shown) minimizes broadband interference in the received signal, while down conversion and digitization circuitry (not shown) down converts the filtered, received signal to an intermediate or baseband frequency signal, which is then digitized into one or more digital streams. The receiver path 30 typically uses one or more mixing frequencies generated by the frequency synthesizer. The BBP 38 processes the digitized received signal to extract the information or data bits conveyed in the signal.

As such, the BBP 38 is typically implemented in one or more digital signal processors (DSPs).

With continued reference to FIG. 2, on the transmit side, the BBP 38 receives digitized data, which may represent voice, data, or control information, from the control system 40, which it encodes for transmission. The encoded data is output to the transmitter path 32, where it is used by a modulator (not shown) to modulate a carrier signal at a desired transmit frequency. An RF power amplifier (not shown) amplifies the modulated carrier signal to a level appropriate for transmission, and delivers the amplified and modulated carrier signal to the antenna 34 through the switch 36. Collectively, the receiver path 30, the transmitter path 32, and the frequency synthesizer may be considered a transceiver 50.

With continued reference to FIG. 2, a user may interact with the mobile terminal 12 via the user interface 44, such as through a microphone 52, a speaker 54, a keypad 56, and/or a display 58. Note that in some embodiments, the keypad 56 and the display 58 may be combined into a touch screen display. Audio information encoded in the received signal is recovered by the BBP 38, and converted into an analog signal suitable for driving the speaker 54. The keypad 56 and the display 58 enable the user to interact with the mobile terminal 12. For example, the keypad 56 and the display 58 may enable the user to input numbers to be dialed, access address book information, or the like, as well as, monitor call progress information. The memory 46 may have the software 48 therein as noted above which may effectuate or facilitate operation of the mobile terminal 12.

As noted, exemplary embodiments of the present disclosure allow the mobile terminal 12 to communicate with more than one network 14, 16 by allowing the mobile terminal 12 to operate with multiple network access cards. While it is certainly possible to have each network access card operate with a respective transceiver (e.g., the transceiver 50) for each network 14, 16 with which the mobile terminal 12 will operate (e.g., DSDS or DSDA), such duplicative operation consumes area within the mobile terminal 12, requires routing of many duplicative conductors, and is generally wasteful of resources within the mobile terminal 12.

An exemplary embodiment of the present disclosure helps reduce the duplicative conductors and waste referenced above by consolidating communication to and from the network access cards on a single data bus. The plurality of network access cards allows use of multiple networks, which as explained above, is its own form of desirable flexibility. Likewise, each BBP endpoint may have access to the data bus. By connecting each BBP endpoint and each network access card to a single data bus, each BBP endpoint may communicate with each network access card. This arrangement provides flexibility for the BBP endpoint to choose which network with which to establish a voice/data call based on conditions in the device or on policies established in the device. This arrangement further allows savings in pin counts on circuits within the mobile terminal 12, silicon area, board area, power consumption, and cost. Likewise, this arrangement provides the ability to scale to almost any number of network access cards and allows for the use of virtual network access cards if desired. Such virtual network access cards may be used in a code division multiple access (CDMA) system such as CDMA2000, where there is no specific need for a physical network access card, and credentials are established via secure communications between the BBP endpoint and a mobile network operator (MNO). This process may result in the maintenance of "secure keys" within the memory 46 or memory of the BBP 38. Still further, this arrangement allows the interface for the network access card to be hosted within an applications processor, a modem, or both, depending on design criteria. Such improved flexibility is a benefit to designers. Further flexibility is enabled because the BBP or the applications processor may be physically located within the same integrated circuit (IC) or across multiple chips. This flexibility provides advantages for the designer in that product capabilities may be determined much later in the product development cycle to adapt to changing market conditions and requirements.

Figure 3:
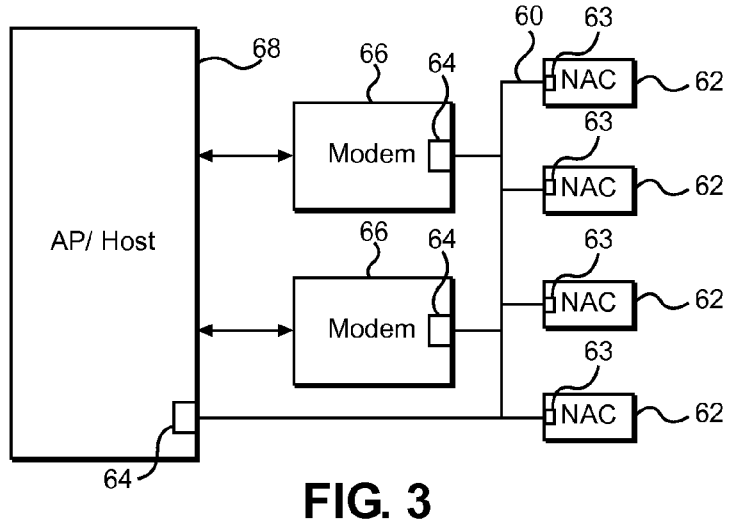
FIG. 3 is a simplified block diagram of a first embodiment of a computing system with a serial data bus for coupling multiple network access cards to multiple distributed baseband processor endpoints.

In this regard, FIG. 3 illustrates a first exemplary embodiment of a data bus 60 that couples multiple network access cards (NAC) 62, and particularly NAC interface 63, to bus interfaces 64 (also referred to herein as a communication interface). In an exemplary embodiment, the data bus 60 is a serial bus. As illustrated, the bus interfaces 64 may be positioned within a modem 66 or an application processor 68 (sometimes referred to as a host). The modems 66 and the application processor 68 may further include a BBP (not shown) that operates as a BBP endpoint. Each bus interface 64 may include a multiplexer/demultiplexer (MUX/DE-MUX) (not shown) bus arbitration and may include voltage translation logic as needed or desired. Further, the bus interface 64 may include a serializer to serialize data before placing the data on the data bus 60. Additionally, the bus interface 64 may include a deserializer to deserialize data from the data bus 60. In an exemplary embodiment, the bus interface 64 may append an address to data placed on the data bus 60 and may place data on the data bus 60 according to a time division multiplex (TDM) protocol. The source address of the sending endpoint, and one or more destination addresses, may be placed in a protocol field prior to the payload messages sent on the data bus 60. It should be appreciated that the NAC interface 63 is essentially the same as bus interface 64 but provides these functions for the NAC 62. Typically, data transfer is between one BBP (source address) and one NAC 62 (destination address) in a point-to-point message, but can involve one BBP to multiple NACs 62 in a broadcast or multicast message. Similarly, data exchange can occur between two BBPs and two NACs 62. It can be appreciated that data exchange can occur between any number of endpoints on the data bus 60. In an exemplary embodiment of one data line, only one message from source to destination is enabled onto the data bus 60, and when this message transfer is complete, the next message that may have been halted due to bus occupancy will be sent.

The NACs 62 may be SIM cards or UICCs as needed or desired. Likewise, the NACs 62 may be virtual such as in a CDMA system as described above. Although "virtual", such virtual NACs may still be a physical endpoint in the designed silicon capable of communications on the data bus 60. In another exemplary embodiment, the NAC 62 may be a multi-SIM card, such as discussed above. In this context, each NAC 62 is provided a bus address on the data bus 60, and each "sub-SIM" is provided a sub-address for each bus address. In still another exemplary embodiment, the NAC 62 may be a solder-down, non-receptacle SIM card, such as may be used in specific applications where environmental factors such as vibration, heat, or the like, or other factors such as theft prevention may prevent the use of connectors and removability (e.g., automobiles).

Likewise, while not illustrated, it should be appreciated that the NACs 62 may be removable cards that may be inserted into a NAC interface that has appropriate conductors to interoperate with the NACs 62, and includes a receptacle sized so as to receive the removable NACs 62. In an exemplary embodiment, the NACs 62 may have a proprietary new form factor that includes SIM cards and UICCs. It should be appreciated that each of the modems 66 and the application processor 68 may be embodied as distinct and separate integrated circuits or could be separate components within a single integrated circuit. The NAC interface may likewise include a serializer and deserializer to serialize data placed on to the data bus 60 and deserialize data received from the data bus 60. As noted above, the NAC interface may be designed to operate according to a TDM protocol when sending and receiving data from the data bus 60. The NAC interface may further be designed to provide power to the NAC 62 on one or more discrete conductors. Alternately, NAC power can be provided separately from the bus interface. Such "out of band" power may be sourced by a separate power management chip.

Figure 4:
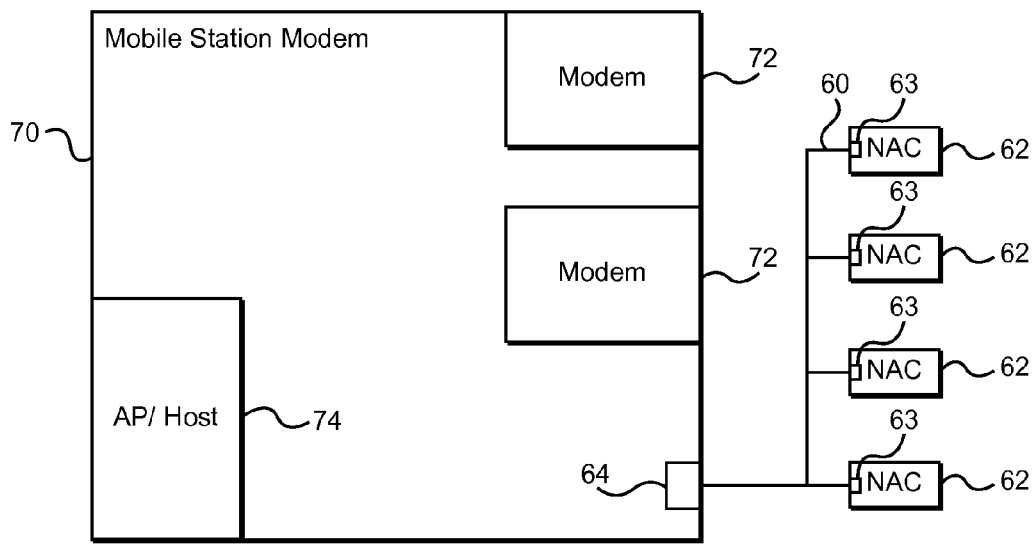
FIG. 4 is a simplified block diagram of a second embodiment of a computing system with a serial data bus for coupling multiple network access cards to multiple integrated baseband processor endpoints.

FIG. 4 illustrates a second exemplary embodiment of a data bus 60 coupling multiple NACs 62 to a mobile station modem 70. The mobile station modem 70 may include one or more modems 72, as well as an application processor 74 (sometimes referred to as a host). It should be appreciated that the modems 72 and the application processor 74 may each include a BBP and operate as a BBP endpoint. It should be appreciated that the mobile station modem 70 may be embodied as a single integrated circuit or may be part of a system on a chip (SOC). As noted above, the data bus 60 may operate according to a TDM protocol and each interface may include serializers and deserializers for data conversion from and to the data bus 60. In place of the aforementioned TDM protocol, a frequency division multiplex (FDM) protocol could be used for this embodiment, or for the embodiment of FIG. 3. In such an FDM protocol, each master is assigned a given frequency channel. Still other protocols may be used to avoid conflict on the data bus 60.

Figure 5:
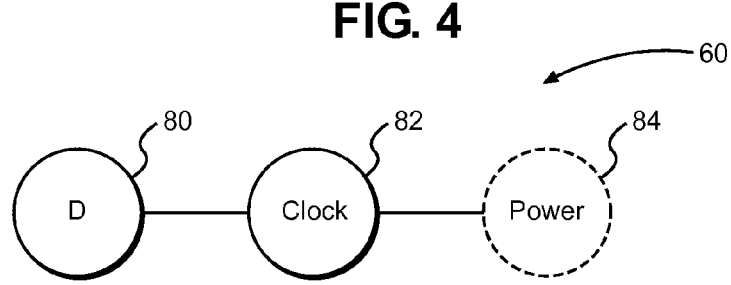
FIG. 5 is a simplified cross-sectional view of an exemplary data bus, such as may be used with the embodiments of FIGS. 3 and 4.

The data bus 60 is better illustrated in FIG. 5 as a cross-sectional view of a ribbon cable with two conductors 80, 82 and an optional conductor 84. The first conductor 80 is a data channel. The second conductor 82 is a clock channel. The optional conductor 84 is a power channel. While illustrated as a ribbon cable, it should be appreciated that the conductors 80, 82, 84 may be wire traces on a printed circuit board or other arrangement without departing from the scope of the present disclosure. As noted above, serializers and a TDM protocol are used to place data on the data bus 60 by the various endpoints of the data bus 60. Deserializers and correct addressing schemes allow the destination endpoints to extract data from the data bus 60. While note shown, another conductor may be a ground conductor. While not shown, another conductor may be a second data conductor, and data be viewed as transmitted independently on each data conductor, or the two conductors may be grouped to send two bit symbols for each clock period. Symbol encoders and decoders would be required for bit-to-symbol conversion in the transmitter and symbol-to-bit conversion in the receiver. In an exemplary embodiment, the clock channel on the second conductor 82 may carry data such as in a CCIe (Camera Control Interface extended) protocol as has been presented to the Mobile Industry Processor Interface (MIPI) Alliance. Further, while contemplated as a digital interface, an analog interface may be used with just power, ground, and analog conductors.

Figure 6:
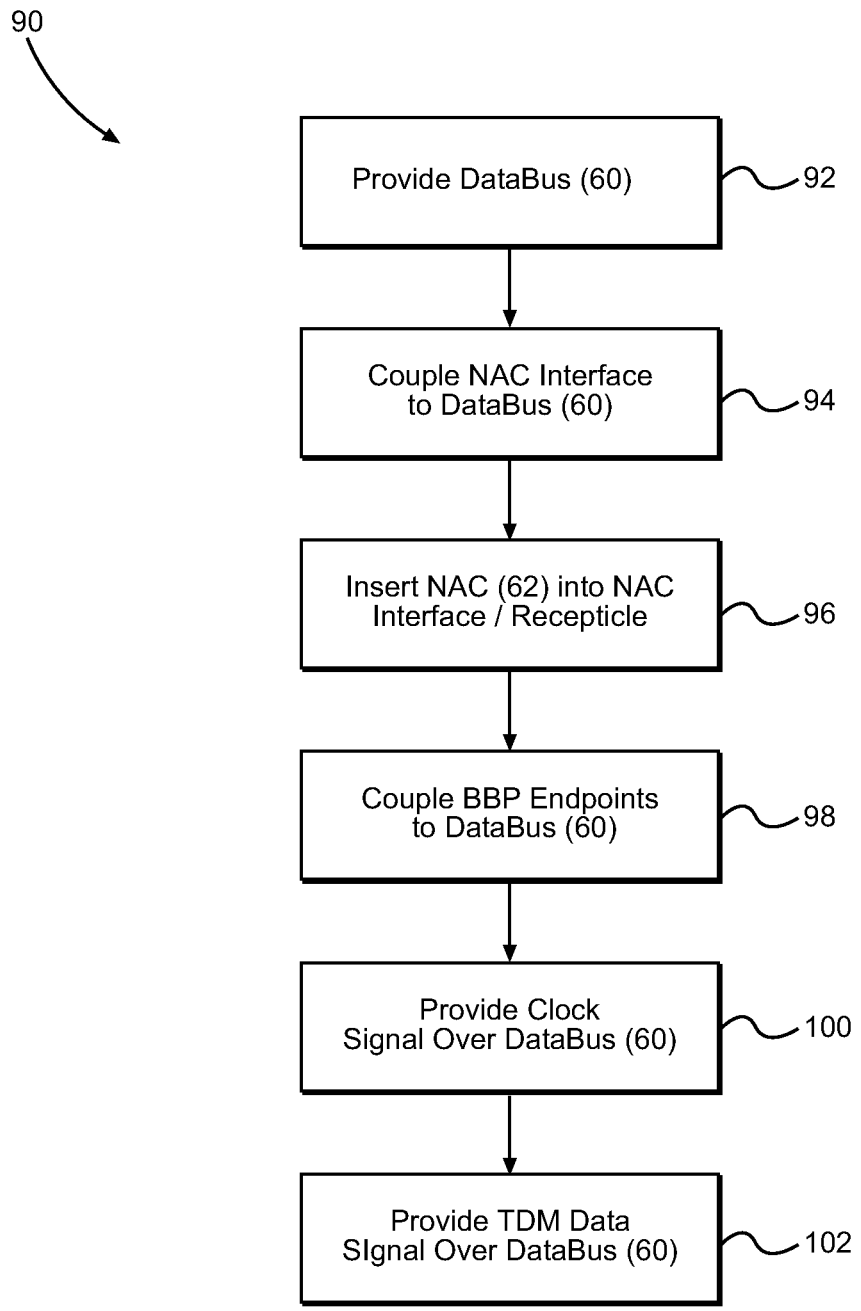
FIG. 6 is a simplified flow chart illustrating assembly of a data bus according to an exemplary embodiment of the present disclosure.
Figure 7:
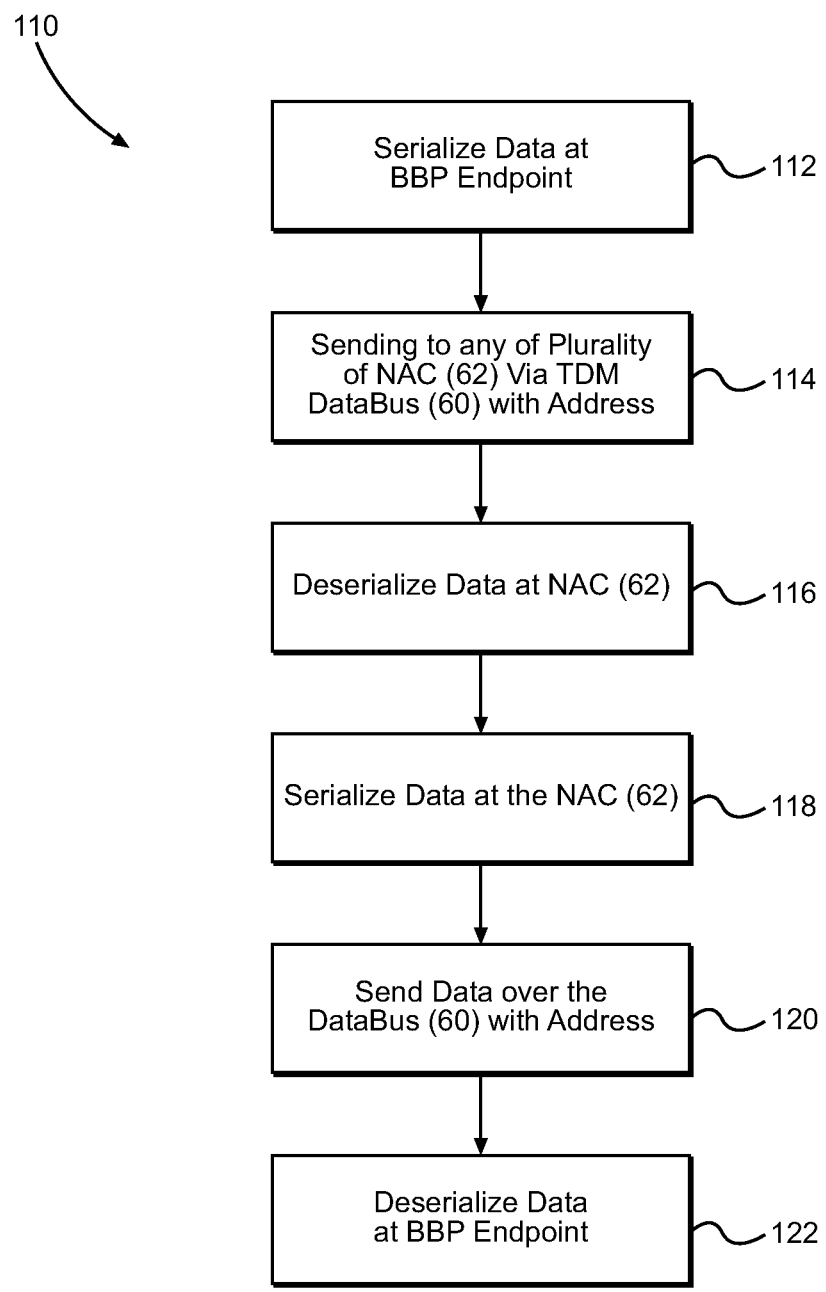
FIG. 7 is a simplified flow chart illustrating operation of a data bus according to an exemplary embodiment of the present disclosure.

Against this explanation of the structure, the methods of using embodiments of the present disclosure are provided with reference to FIGS. 6 and 7. In this regard, FIG. 6 illustrates a process 90 for assembling a mobile terminal 12, and particularly for assembling the data bus 60 within the mobile terminal 12. The process 90 begins by providing the data bus 60 (block 92). The NAC interfaces are coupled to the data bus 60 (block 94). The NAC(s) 62 are inserted into corresponding NAC interface receptacles (block 96). BBP endpoints are then coupled to the data bus 60 (block 98). A clock signal is provided over the data bus 60 (block 100). A TDM data signal is then provided over the data bus 60 (block 102).

FIG. 7 illustrates a process 110 of operating a computing system within a mobile terminal 12. The process 110 begins by serializing the data at a BBP endpoint (block 112). This serialized data is sent to any of the NACs 62 coupled to the data bus 60 via the data bus 60 using an appropriate address (block 114). The data is deserialized at the NAC 62 (block 116). The process 110 reverses the communication process by serializing data at the NAC 62 (block 118) and sending data over the data bus 60 with an address for a BBP endpoint (block 120). The data is then deserialized at the BBP endpoint (block 122).

In some situations, a wireless local area network (WLAN) may require credentials that are stored on a SIM card or a UICC. Embodiments of the present disclosure are readily adapted for use in such situations. That is, a NAC 62 with the WLAN credentials may be coupled to the data bus 60. A WLAN modem may be coupled to the data bus 60. The WLAN modem may (or may not) include a BBP endpoint, but would be able to retrieve the credentials from the NAC 62 across the data bus 60 and provide to the WLAN router as needed. In a related exemplary embodiment, Near Field Communications (NFC) may use a Secure Element (SE), which may be considered a type of modem and UICC.

It should be appreciated that the most area savings is achieved through a single data bus 60, a system might instantiate more than one bus, such as might be desired for reasons of routing complexity of the traces on a printed circuit board.

The systems and methods for multiple network access by mobile computing devices according to embodiments disclosed herein, may be provided in or integrated into any processor-based device. While more useful for mobile computing devices or mobile terminals, the disclosure is not so limited. Accordingly, examples, without limitation, of processor-based devices that may incorporate embodiments of the present disclosure include a set top box, an entertainment unit, a navigation device, a communication device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 8:
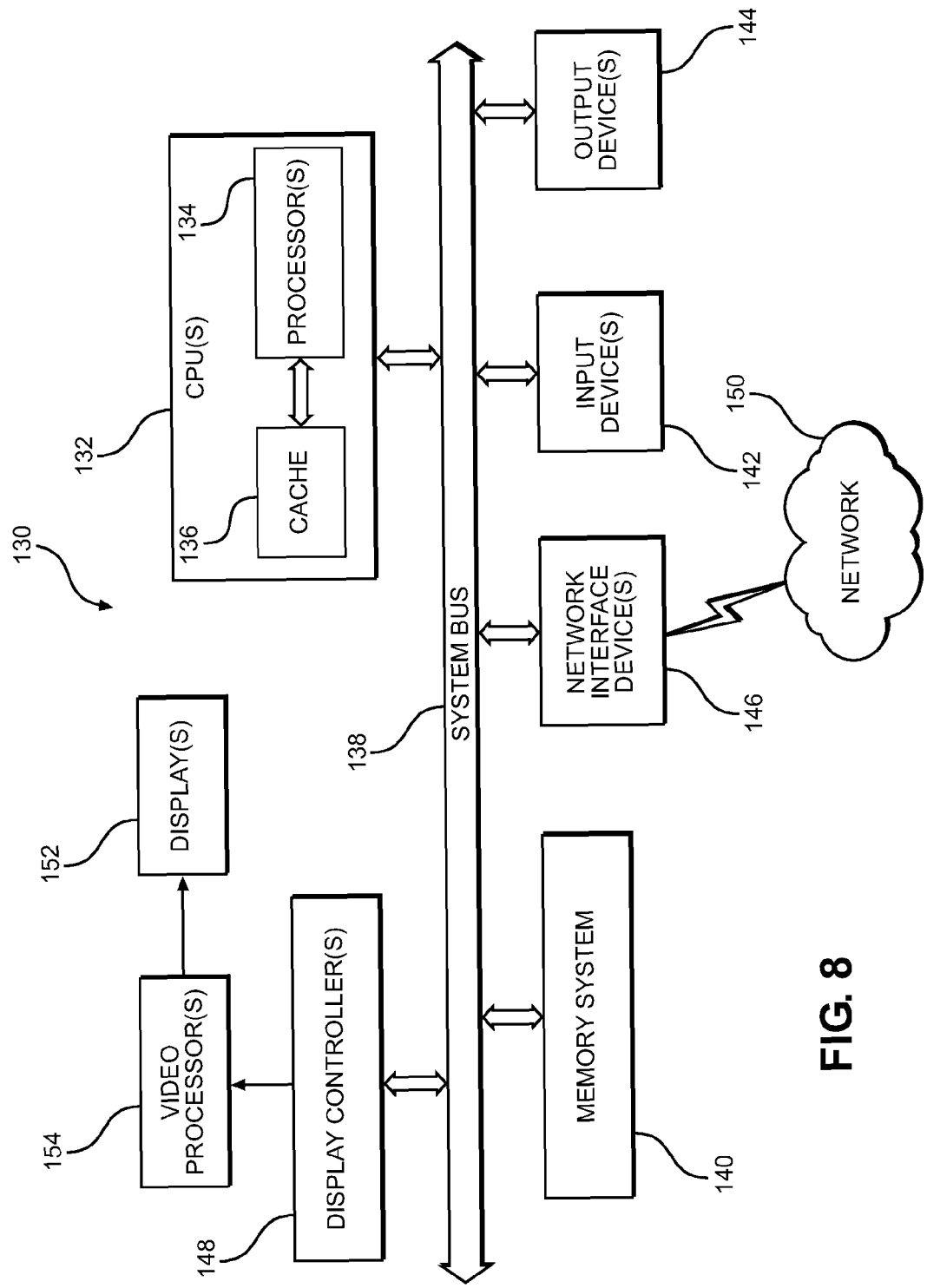
FIG. 8 is a block diagram of an exemplary processor-based system that can include the data bus of FIGS. 3 and 4.

In this regard, FIG. 8 illustrates an example of a processor-based system 130 that can employ the data bus 60 with BBP endpoints and NACs 62 illustrated in FIGS. 3 and 4. In this example, the processor-based system 130 includes one or more central processing units (CPUs) 132, each including one or more processors 134. The CPU(s) 132 may have cache memory 136 coupled to the processor(s) 134 for rapid access to temporarily stored data. The CPU(s) 132 is coupled to a system bus 138. Note that the system bus 138 is not the data bus 60 described above. As is well known, the CPU(s) 132 communicates with these other devices by exchanging address, control, and data information over the system bus 138. For example, the CPU(s) 132 can communicate bus transaction requests to a memory system 140.

Other devices can be connected to the system bus 138. As illustrated in FIG. 8, these devices can include the memory system 140, one or more input devices 142, one or more output devices 144, one or more network interface devices 146, and one or more display controllers 148, as examples. The input device(s) 142 can include any type of input device, including but not limited to, input keys, switches, voice processors, etc. The output device(s) 144 can include any type of output device, including but not limited to, audio, video, other visual indicators, etc. The network interface device(s) 146 can be any devices configured to allow exchange of data to and from a network 150. The network 150 can be any type of network, including but not limited to, a wired or wireless network, a private or public network, a local area network (LAN), a wide local area network (WLAN), and the Internet. The network interface device(s) 146 can be configured to support any type of communication protocol desired.

The CPU(s) 132 may also be configured to access the display controller(s) 148 over the system bus 138 to control information sent to one or more displays 152. The display controller(s) 148 sends information to the display(s) 152 to be displayed via one or more video processors 154, which process the information to be displayed into a format suitable for the display(s) 152. The display(s) 152 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a DSP, an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description, may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but are to be accorded the widest scope consistent with the principles and novel features disclosed herein.

What is claimed is:

1. A computing system comprising:
   a plurality of baseband processor endpoints;
   a data bus comprising a clock channel and a data channel;
   a plurality of network access card interfaces coupled to the data bus, each network access card interface configured to receive a network access card; and
   a communication interface configured to couple the data bus to the plurality of baseband processor endpoints for allowing serialized communication from each of the plurality of baseband processor endpoints to any one of a plurality of network access cards over the data bus;
   wherein at least one of the plurality of network access cards comprises a card selected from the group consisting of a subscriber interface module (SIM) card, a universal integrated circuit card, and a virtual network access card.

2. The computing system of claim 1, wherein the plurality of baseband processor endpoints comprises modems.

3. The computing system of claim 1, wherein the plurality of baseband processor endpoints is distributed amongst a plurality of integrated circuits.

4. The computing system of claim 1, wherein the plurality of baseband processor endpoints is positioned within a single integrated circuit.

5. The computing system of claim 1, wherein at least one of the plurality of baseband processor endpoints comprises an application processor.

6. The computing system of claim 1, wherein the communication interface is configured to serialize through a time division multiplex (TDM) serialization process.

7. The computing system of claim 1, wherein the communication interface comprises a first pin configured to convey a clock signal and a second pin configured to convey a data signal.

8. The computing system of claim 7, wherein the communication interface further comprises a power pin configured to convey a power signal.

9. The computing system of claim 1, wherein the communication interface comprises a two or more bit encoder/decoder.

10. The computing system of claim 1, wherein the communication interface comprises a multiplexer/demultiplexer logic.

11. The computing system of claim 1, wherein the communication interface is configured to communicate through analog transmission and reception.

12. A computing system comprising:
a plurality of network access card interfaces, each configured to receive a physical, removable network access card;
a plurality of baseband processor endpoints; and
a data bus comprising a data channel and a clock channel, the data bus coupled to each of the plurality of network access card interfaces and the plurality of baseband processor endpoints, such that each of the plurality of baseband processor endpoints is configured to communicate with each network access card positioned in any of the plurality of network access card interfaces over the data bus;
wherein at least one of a plurality of network access cards comprises a card selected from the group consisting of a subscriber interface module (SIM) card, a universal integrated circuit card, and a virtual network access card.

13. The computing system of claim 12, wherein the data bus further comprises a power channel.

14. The computing system of claim 12, wherein at least one of the plurality of network access card interfaces is configured to accept a subscriber interface module (SIM) card.

15. The computing system of claim 12, wherein at least one of the plurality of network access card interfaces is configured to accept a universal integrated circuit card (UICC).

16. The computing system of claim 12, further comprising a virtual network access card coupled to the data bus.

17. The computing system of claim 12, wherein a plural subset of the plurality of baseband processor endpoints each comprises a respective bus interface.

18. The computing system of claim 12, wherein a plural subset of the plurality of baseband processor endpoints shares a bus interface.

19. A method of assembling a mobile terminal comprising:
providing a serial data bus comprising a clock channel and a data channel;
coupling a plurality of network access cards to the serial data bus through a plurality of network access card interfaces coupled to the serial data bus; and
coupling a plurality of baseband processor endpoints to the serial data bus such that each of the plurality of baseband processor endpoints communicates with any of the plurality of network access cards over the serial data bus;
wherein at least one of the plurality of network access cards comprises a card selected from the group consisting of a subscriber interface module (SIM) card, a universal integrated circuit card, and a virtual network access card.

20. The method of claim 19, wherein coupling the plurality of baseband processor endpoints to the serial data bus comprises coupling a single bus interface to the serial data bus that is shared between the plurality of baseband processor endpoints.

21. The method of claim 19, further comprising coupling a virtual network access card to the serial data bus.

22. The method of claim 19, further comprising providing a clock signal over the serial data bus.

23. The method of claim 19, further comprising power over the serial data bus.

* * * * *